United States Patent [19]

Kazares

[11] 4,206,009
[45] Jun. 3, 1980

[54] MICRO-COMPUTER AND PROGRAMMER FOR APPLICATION OF TIRE TREAD MATERIAL

[75] Inventor: Richard E. Kazares, Huntington Beach, Calif.

[73] Assignee: AMF Incorporated, White Plains, N.Y.

[21] Appl. No.: 918,752

[22] Filed: Jun. 26, 1978

Related U.S. Application Data

[63] Continuation of Ser. No. 780,620, Mar. 23, 1977, abandoned.

[51] Int. Cl.² .............................................. B29H 17/36
[52] U.S. Cl. .................................... 156/130; 156/361; 156/397; 226/179; 242/207
[58] Field of Search ...................... 156/96, 128 R, 130, 156/184, 186, 187, 189, 350, 361, 363, 397, 405, 443, 446, 448; 226/42, 14, 179; 242/206, 207, 208

[56] References Cited

U.S. PATENT DOCUMENTS

| | | | |
|---|---|---|---|
| Re. 28,043 | 6/1974 | Hineline | 156/130 |
| 3,177,918 | 4/1965 | Holman | 156/128 R |
| 3,251,722 | 5/1966 | Holman | 156/130 |
| 3,264,162 | 8/1966 | Holman | 156/130 |
| 3,308,000 | 3/1967 | Holman | 156/130 |
| 3,843,482 | 10/1974 | Wireman et al. | 156/130 |

OTHER PUBLICATIONS

"140 Floppy Disk Drive OEM Reference Manual" by CAL Comp.
Motorola "Microprocessing Unit MC6800" reference manual, pp. 21–38.
Motorola "Random Access Memory MCM6810A" advance information sheets, pp. 111–114.
"Keyboard Specification" by Grayhill, LaGrange, Ill, copyright 1976.

Primary Examiner—John E. Kittle
Attorney, Agent, or Firm—George W. Price; Charles J. Worth

[57] ABSTRACT

The invention relates to the formation of a tire tread profile by the application of rubber tread material upon a tire casing by employing a micro-computer programmer in conjunction with a tread material applicator apparatus. The control system employed during tread formation uses a programmer having a micro-computer unit, a floppy disk and a keyboard, interfaced with a tread material application apparatus.

In operation, the programmer is connected to a drive motor of the tire tread application assembly and operates under the control of a tire profile program stored in the floppy disk. Proper tread profile shape is arrived at as a function of the digital ratio between the actual position of the tire rotation and the transverse position of the tire tread applicator assembly. The latter is digitally controlled within the parameters of a preprogrammed set of commands, as a direct and sole function of the position of the tire casing about its spin axis.

11 Claims, 2 Drawing Figures

MICRO-COMPUTER AND PROGRAMMER FOR APPLICATION OF TIRE TREAD MATERIAL

This is a continuation of application Ser. No. 780,620, filed Mar. 23, 1977, now abandoned.

BACKGROUND OF THE INVENTION

The present invention is directed to method and apparatus for use in application of rubber ribbon material for the formation of tire tread on a substrate such as a tire carcass. More particularly, the present invention is directed to method and apparatus employed in conjunction with a tire building machine such as shown and described in U.S. Pat. No. 3,177,918 enabling the deposition of elastomeric material upon a substrate in a controlled fashion in accordance with a predefined tread profile. In carrying out the invention, a programmed is employed having principally; a micro-computer, a floppy disk and a keyboard.

By means of the present invention, it becomes possible to utilize current micro-processor technology enabling readily attainable changes to a finished tread profile by associated software modifications rather then hardware changes.

In the past, other systems known to the applicant, for example, U.S. Pat. No. 3,308,000 have been employed for controlling the application of the elastomeric material to a substrate. In this arrangement a tire tread winding apparatus employs a mechanically controlled arrangement for applying elastomeric ribbon to a tire casing. However, the approach disclosed in this prior art is purely mechanical and employs a mechanical programmer and associated spin revolution counter.

Also familiar to the applicant is U.S. Pat. No. 3,843,482 which is directed to a tire tread winding machine employing a tape for controlling the amount of spin of the rubber ribbon applicator assembly and also the amount of azimuth displacement for ribbon thickness control.

Other patents known to applicant further illustrate well known approaches for controlling the movement of a tire tread programmer. However, in no instance has the prior art defined a combination in which the use of an interface with a tread application apparatus is such, that the instantaneous tire spin rotational position forms the basis of a series of digital commands enabling extremely precise digitally controlled simultaneous transverse motion of the tire.

The prior systems have employed apparatus for tread application which have utilized additional variables of time, tire rotation velocity, or template sensing. By eliminating these variables, errors associated in their measurement and control have been eliminated. The present invention provides tire transverse position control directly as a programmed function of tire rotational position.

SUMMARY OF THE INVENTION

The main object of the present invention is to overcome the defects of the prior art.

A further object of the present invention is to provide a method and apparatus by which a predefined program forms a specific tread profile upon a tire carcass and governs the transverse movement of the tread material as it is applied.

A further object of the present invention is to provide a method and apparatus by which the tire rotation position is monitored during tread material application, so that the displacement between rotational position and transverse position of the tire carcass forms a discrete relationship for governing the tread material profile.

Additional objects and advantages of the present invention will be more readily understood with reference to the accompanying specification, claims and drawings.

It follows that the use of an interface employing a micro-computer programmer for a tread application apparatus represents a new and novel approach for controlling the profile of tread material as is applied upon a substrate.

Generally, in accordance with the present invention, the micro-computer programmer is interfaced with the tire building machine and provides a basis by which the tread ribbon applicator and tire carcass mounting assembly are governed in order to enable the application of extruded ribbon in synchronization with the position of the tire about its spin axis. This is accomplished by interfacing a microcomputer programmer with the applicator assembly of the tire building machine through a D.C. stepper motor employed to drive the applicator assembly and control its position with respect to the tire carcass as it rotates during tread material application.

The principal features of the present invention are directed to an apparatus employed in the formation of a tire tread profile upon a tire surface by supplying elastomeric tread material upon a rotating tire carcass mounted upon a tire rotation assembly. The tire is rotated by a conventional motor and a stepper motor is employed to incrementally advance the rotating tire in a transverse direction during tread formation. The tire rotation assembly motor in turn is connected to a tire rotation monitor for monitoring the incremental angular displacement of the tire during rotation. A control assembly defined by a micro-computer is disposed intermediate the rotation monitor and the stepper motor, whereby the micro-computer computes respective output signals for governing the stepper motor to control tire tread profile build-up in accordance with a predefined program stored in the micro-computer.

Also within the scope of the present invention is a method of controlling the formation of a tread profile upon a rotating tire surface, by the application of elastomeric tread material as the tire surface is urged to traverse a defined course of travel. A tire profile program in the form of a series of tire profile segments is introduced into a micro-computer that is responsive to tire movement during tread profile formation. Thereafter, increments of the rotating tire are measured and incremental motion imparted in the transverse direction to the rotating tire. Electrical input signals measuring the circumferential angular displacement increments of the rotating tire are transmitted into the micro-computer and in turn a series of output signals are transmitted by the micro-computer for imparting incremental motion to the tire, as a function of the tire profile segments. Lastly, the angular displacement input signals are counted and compared to the programmed segment length with a next program segment being then introduced into the micro-computer when the counts are equal.

IN THE DRAWINGS

DESCRIPTION OF PREFERRED EMBODIMENT

Figure 1:
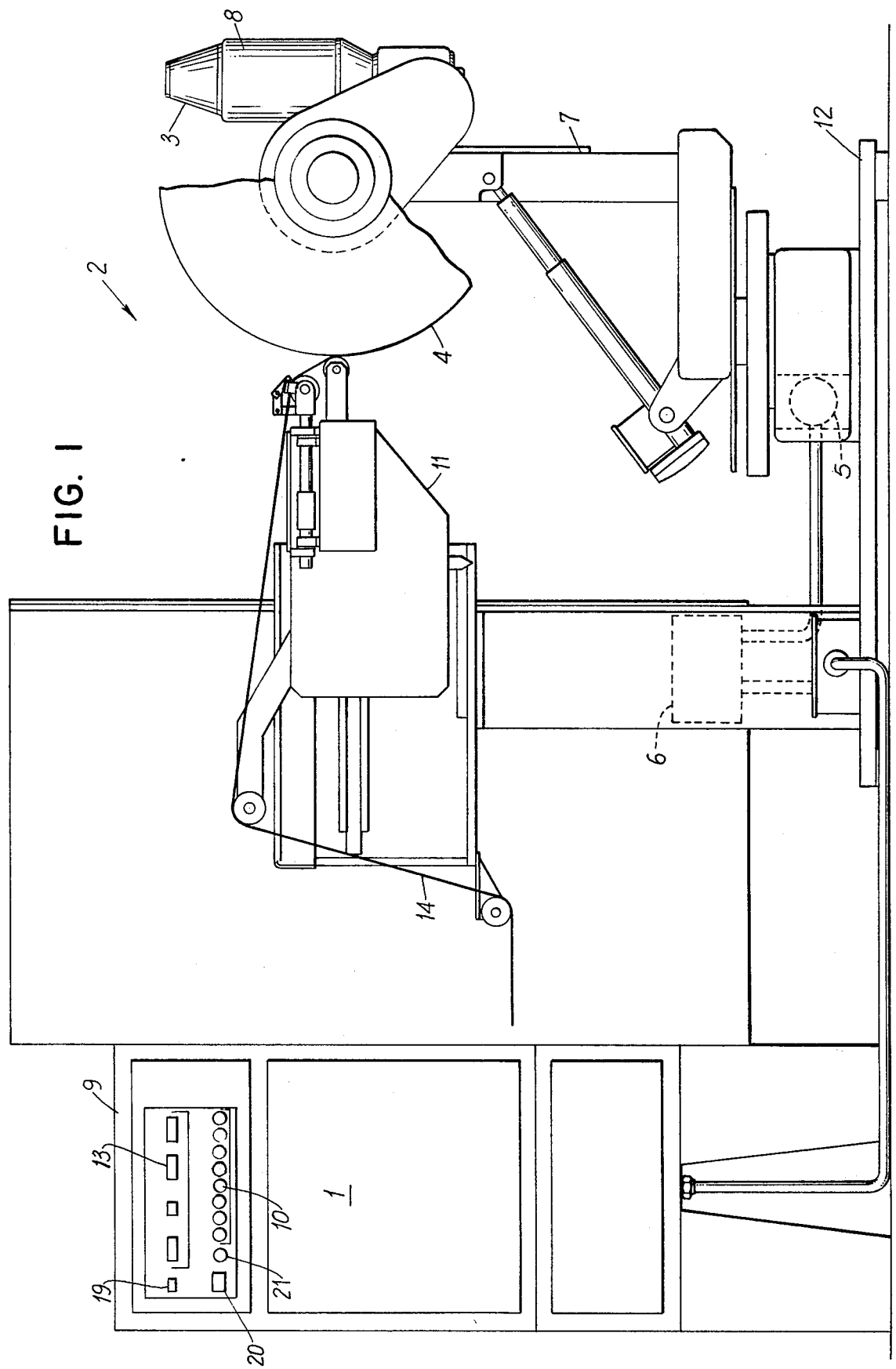
FIG. 1 is a front elevational view of the present invention employing a rubber tread material applicator assembly and a tire carcass rotational assembly for the placement of tread material upon a tire carcass.

In accordance with the operation of the invention, the basic tire building machine consisting of the tread applicator assembly 11, machine frame 12 and the carcass manufacturing assembly 7 are of the type described and disclosed in U.S. Pat. No. 3,177,918. The reference numerals in this application do not necessarily correspond to those of the aforementioned patent.

As shown in FIG. 1, a micro-computer 1 is employed and forms part of the total apparatus 2. In operation, the micro-computer 1 accepts rotation position signals from a digital encoder 3 which is directly coupled to the tire carcass spin drive motor 8. The signals have the form of a series of electrical pulses which are a direct function of the circumferential position of tire carcass 4 about its spin axis. The micro-computer 1 employs previously stored tread profile data and relates that to the input pulses in order to control the transverse position of the tire carcass 4. These output signals take the form of a series of electrical pulses transmitted to a D.C. stepper motor 5 through a stepper drive assembly 6. The D.C. stepper motor 5 and associated drive assembly 6 form a system which translates electrical pulses into discrete angular position increments of the stepper motor 5 to ultimately govern and provide motive power for the transverse motion of the tire carcass assembly 7.

Figure 2:
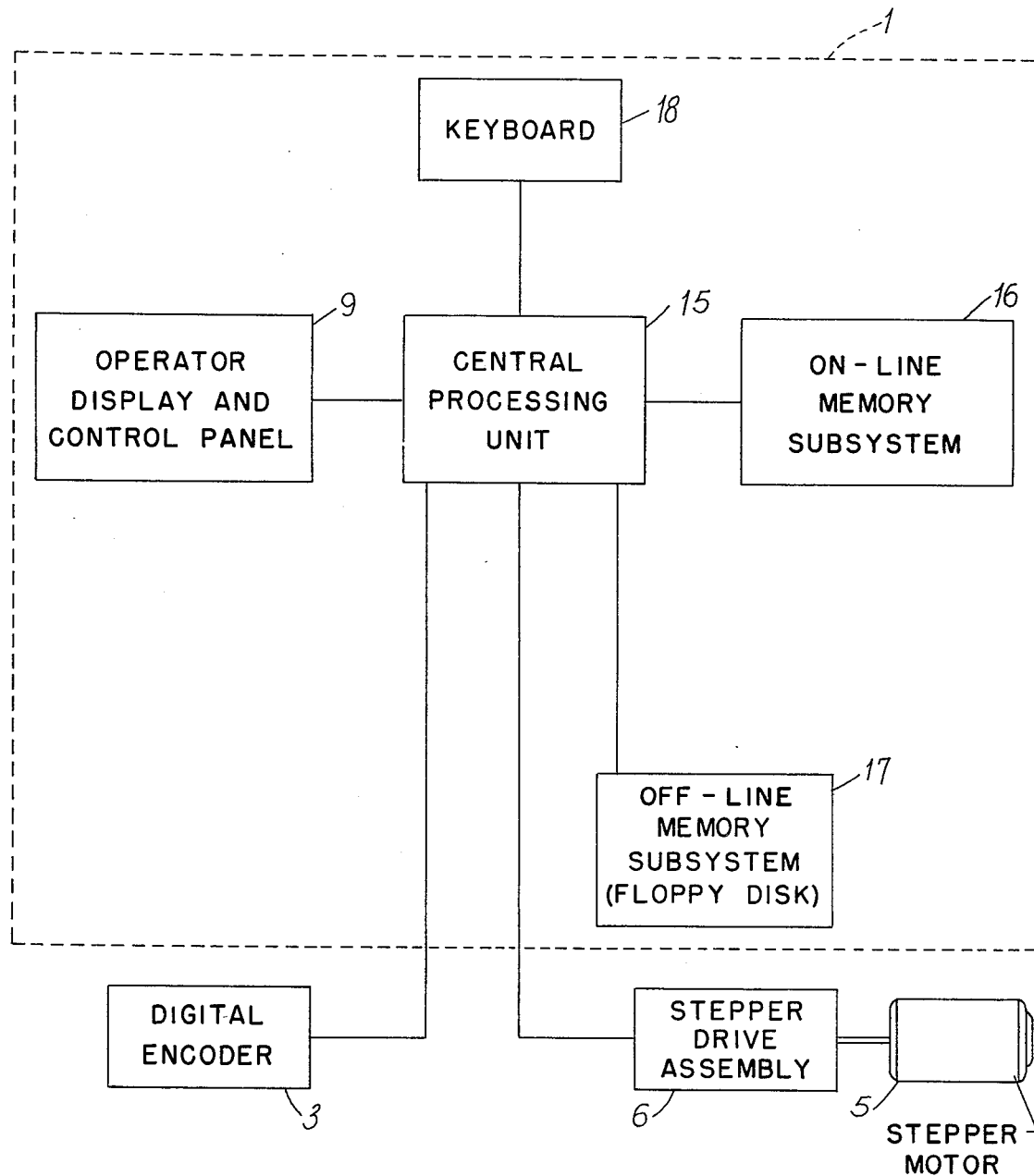
FIG. 2 is a block-diagram of the micro-computer of the invention together with major input-output devices.

The block diagram in FIG. 2 illustrates the micro-computer 1 and associated hardware. An operator display and control panel 9 contains an array of push button switch actuators 10 (FIG. 1) and LED displays 13 (FIG. 1) for controlling and monitoring: the tread applicator assembly 11, (FIG. 1) the carcass mounting assembly 7, and the operation of placing tread material 14 upon a tire carcass 4 under program control.

The operator display and control panel 9 is connected to the central processing unit 15 provided with a commercially available micro-processor unit such as Motorola MC6800 as shown in the "Motorola M6800 Microcomputer System Design Data Manual" published in 1976 by Motorola Inc.; Phoenix, Arizona. An on-line memory sub system 16 is connected to the central processing unit 15. In operation the on-line memory sub-system 16 contains all necessary program data to operate the inventive apparatus 2 and control the relative positions of the tire carcass 4 and the tread application assembly 11. The central processing unit 15 provides the necessary program steps to execute the instructions contained in the on-line memory sub-system 16. The on-line memory sub-system 16 employed herein can be of the type composed of such commercially available components as Motorola MCM 6810A X 8 Bit Static Random Access Memory shown and described on page 111 of the "M6800 Micro-computer System Design Data Manual", published in 1976, by Motorola Inc.; Phoenix, Arizonia.

An off-line memory sub-system 17 contains all of the active and non-active machine logic coding as well as, all tire profile programs as stored by the operator and entered through a keyboard 18 of the type such as, commercially available Grayhill keyboard shown and described in Bulletin 262, Published in 1976 by Grayhill Inc.; La Grange, Ill. The off-line memory sub-system 17 employs a floppy disk drive, such as commercially available CalComp 140 Floppy Disk Drive Shown and in "140 Floppy Disk Drive OEM Reference Manual", published in 1974 by California Computer Products Inc.; Anaheim, Calif.

GENERAL DESCRIPTION OF THE MICRO-COMPUTER

A specifically developed program is employed after the necessary tread profile data and its relationship to the apparatus are obtained from calculated data. This information, in turn, is entered directly into the micro-computer 1 through use of a keyboard 18. It follows that each program can be permanently stored and, in turn retrieved by operator action as will be explained hereinafter. Likewise, corrections or subsequent modifications can be easily and simply keyed in and stored; and a modified program can replace or supplement the original program.

The actual structure defining the micro-computer 1 includes a series of sub-systems (see FIG. 2) which are electrical in nature and are connected to an operator display and control panel 9 provided with a series of push button switch actuators 10 (see FIG. 1) for controlling the inventive apparatus 2. For an example, the tread applicator assembly 11 can be controlled to travel manually towards the left or right direction respectively or to a designated "home" position through appropriate push button switch actuators 10. The initial position of the tread applicator assembly 11 prior to starting the tire program is arrived at through a program reset function which has been previously calculated to define the start location. A given tire profile program is retreived from the off line memory 17 by appropriately selecting a predefined designation number on thumb wheel switch 20 and energizing a program load switch 21.

More specifically, the micro-computer 1 is provided with a series of displays, i.e., L.E.D. displays 13, for monitoring the tire profile program parameters. A program display 19 indicates the current tire program number in on-line memory 16. Additional L.E.D. displays show parameters as: program segment or location, the number of tire revolutions in a particular segment of casing build-up, and the surface length of tread applicator travel for a given segment.

During operation, programs which are internally stored by the micro-computer 1 on its off line memory 17 are "read" by dialing-in a designated program identification number on thumb wheel switch 20. The stored program is then recalled from memory by actuating program load switch 21 and placed in readiness to run. Programs can be visually verified since all values are numerically displayed on a series of light emitting diode (LED) displays 13, 19.

MICRO-COMPUTER FUNCTION FOR TREAD PROFILE FORMATION

In operation, as the tire carcass spin drive motor 8 is actuated, a commercially available digital encoder 3 transmits a series of electrical pulses to the micro-computer 1. These pulses are a direct and continuous function of tire carcass rotational position about its spin axis, namely, the axis about which the tire rotates circumferentially during tread material application. More particularly pulses have the characteristics of discrete electrical signals describing extremely small increments of aforesaid tire rotation. In accordance with a predefined program, the micro-computer 1 calculates a ratio which reflects the required tread profile for a given tread profile segment. As used herein, a tire profile segment is intended to mean a geometrical portion of a tire tread profile definable by a fixed and constant relationship between the relative displacements of tire spin and tire transverse motions over a defined length along the transverse line of motion. The output signal of the micro-computer 1 takes the form of an electrical pulse transmitted by the micro-computer 1 to the stepper motor 5 through the stepper drive assembly 6 whereby the tire carcass mounting assembly 7 is urged to move transversely relative to the tire spin axis. The magnitude of the relative motion between tire spin and tire traverse is defined by the ratio calculated by micro-computer 1. The tire profile undergoes variations in geometry according to the prescribed program whereby, the micro-computer 1, changes the ratio between tire spin and transverse motions. This is accomplished by micro-computer 1 counting electrical pulses received from the digital encoder 3 and compares this count to pre-programmed values. Upon matching the pre-programmed value of counted digital encoder 3 pulses, the next programmed ratio is introduced into micro-computer 1. At this time the relative motion between the tire rotation and tire traverse is altered in accordance with the newly introduced ratio.

For each tire tread profile segment the micro-computer 1 using a programmed ratio value, converts pulses received from digital encoder 3 into electrical signals which are transmitted to the stepper motor drive assembly 6. During this time, the micro-computer 1 controls the transverse position relative to the circumferential position of tire carcass 4. This relationship is maintained throughout the entire tire tread profile application operation, even though the tire circumferential spin rate may be undergoing velocity changes. This position relationship is solely based upon tire carcass displacement as represented by discrete electrical pulses transmitted by digital encoder 3. The relative motion between tire spin and traverse are not dependent upon tire velocity or time. In this manner, a significantly more accurate and repeatable tire tread profile build-up may be effected, since with the present invention it becomes possible to directly control the tread profile build-up through the ratio of tire spin and traverse displacements.

It will be understood that the specific embodiments of the invention described herein are given by way of illustration only and that various departures may be made therefrom, all within the scope of the invention. The specific relationships of ribbon wrap to speed of application are cited merely to illustrate the efficiency of the apparatus and method and the results to be expected from the use thereof in practice.

What I claim:

1. In an apparatus having an application assembly providing elastomeric tread material, a rotation assembly driven by motor means mounting and rotating a tire carcass and incremental drive means disposed in working relation to said application and rotation assemblies for moving one of said assemblies in a transverse direction relative to the other for the formation of a tire tread profile in accordance with a predefined program by selectively winding the tread material on the rotating tire carcass, control means comprising:

tire rotation monitoring means connected to said motor means for monitoring the incremental angular displacement of the tire carcass and providing signals representing discrete increments of each revolution of tire carcass rotation; and micro-computer means with stored programs having means for selecting a predefined one of said stored programs and being connected to said monitoring means for receiving said representative signals therefrom;

said micro-computer means producing control signals in response to said representative signals in accordance with said predefined one of said stored programs and being connected to provide the control signals to said incremental drive means; and said control signals resulting from computed ratios defined by the relative positions of said application assembly to the tire carcass and the rotational positions of the tire carcass.

2. In the apparatus in accordance with claim 1, and said micro-computer being provided with means for writing profile programs each having a designation number;

non-destructive memory means for storing profile programs; and means for dialing in a designation number for retreiving a profile program for use.

3. In the apparatus in accordance with claim 2, and said monitoring means comprising a digital encoder providing spin pulses forming the signals representing discrete increments of rotation;

said incremental drive means being a stepping motor; and said micro-computer providing a digital output as the control signal energizing the stepping motor.

4. A method of controlling the formation of a tread profile upon a rotating carcass by the selective application of elastomeric tread material while the rotating tire carcass is caused to traverse a controlled transverse course of travel in response to programming means, including the steps of:

introducing a tire profile program having a series of profile segments into a micro-computer means responsive to signals resulting from tire carcass rotation;

monitoring the incremental angular displacement of the rotating tire carcass and providing input signals to said micro-computer means representing discrete increments of each revolution of tire carcass rotation;

summing the input signals for selection of the appropriate profile program segment and providing output signals in response to the input signal in accordance with the selected profile segment; and incrementally moving the rotating tire carcass along the transverse course in response to the output signals.

5. The method in accordance with claim 4, including the step of:

controlling the transverse motion of the tire carcass during application of the tread material as a function of an input signal to the micro-computer means which is representative of the instantaneous carcass spin rotational position.

6. The method in accordance with claim 4, including the step of:

introducing into the micro-computer means a series of profile segments defined by fixed ratios determined by the tire carcass rotational positions and transverse course of travel.

7. The method in accordance with claim 6, including the steps of:
   introducing a plurality of tire profile programs; and
   means for selecting a predetermined program for use.

8. The method in accordance with claim 6, including the step of:
   introducing new ratios into the microcomputer means in response to variations in tire profile requirements.

9. A method of forming a predefined tread profile upon a tire carcass mounted upon tread formation assembly having drive means for rotating said carcass;
   said tread profile being formed in response to the controlled application of advancing elastomeric material upon a surface on said tire carcass in response to pre-programmed tread profile parameters introduced into a micro-computer means governing respective transverse and rotational positions of said tire carcass, during tread material application, including the steps of:
      introducing into said micro-computer means a series of input signals responsive to tire carcass rotational position about which said tire carcass rotates circumferentially, said input signals being in the form of discrete electrical signals representing discrete increments of each revolution of said tire carcass rotation; and
      controlling the transverse motion of said tire carcass with respect to said advancing electromeric material by said micro-computer means, through maintenance of a relationship between said input signals to said pre-programmed tread profile parameters.

10. A method in accordance with claim 9, including the step of:
   interfacing said micro-computer with monitoring means for transmitting to said micro-computer means tire carcass rotational position input signals as a direct function of the circumferential position of said tire carcass about its spin axis.

11. A method in accordance with claim 9, including the steps of:
   interfacing said micro-computer means with tire carcass transverse motion drive means; and
   providing said drive means with motive power in response to micro-computer means output signals translated into discrete angular position increments.

* * * * *